(12) United States Patent
Autio et al.

(10) Patent No.: US 12,379,788 B2
(45) Date of Patent: Aug. 5, 2025

(54) KEYBOARD FOR TOUCH-SENSITIVE DISPLAY DEVICE

(71) Applicant: Microsoft Technology Licensing, LLC, Redmond, WA (US)

(72) Inventors: Henri A. Autio, Redmond, WA (US); Joni Kristian Arola, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/754,852

(22) PCT Filed: Oct. 12, 2020

(86) PCT No.: PCT/US2020/055197
§ 371 (c)(1),
(2) Date: Apr. 13, 2022

(87) PCT Pub. No.: WO2021/076436
PCT Pub. Date: Apr. 22, 2021

(65) Prior Publication Data
US 2024/0310925 A1     Sep. 19, 2024

(30) Foreign Application Priority Data
Oct. 16, 2019   (NL) ...................................... 2024026

(51) Int. Cl.
*G06F 3/02*       (2006.01)
*G06F 3/023*      (2006.01)
*G06F 3/041*      (2006.01)

(52) U.S. Cl.
CPC .......... *G06F 3/0227* (2013.01); *G06F 3/0231* (2013.01); *G06F 3/04162* (2019.05)

(58) Field of Classification Search
None
See application file for complete search history.

(56) References Cited

U.S. PATENT DOCUMENTS 6,492,978 B1 * 12/2002  Selig ................... G06F 3/04886
                                                 345/173
7,659,885 B2    2/2010  Kraus et al.
(Continued)

FOREIGN PATENT DOCUMENTS

CN      106662974 A       5/2017
EP      2966539 A1 *      1/2016 ........... G06F 1/1637
(Continued)

OTHER PUBLICATIONS

Murray, Peter, "Buttons Morph Out of Your Touchscreen with Tactus", Retrieved From: https://singularityhub.com/2012/06/05/buttons-morph-out-of-your-touchscreen-with-tactus/, Jun. 5, 2012, 4 Pages.

(Continued)

*Primary Examiner* — Duane N Taylor, Jr.
(74) *Attorney, Agent, or Firm* — Alleman Hall & Tuttle LLP

(57) ABSTRACT

Examples are disclosed that relate to a keyboard for a touch-sensitive display device. One example provides a touch-sensitive display device comprising a touch sensor, a display, a wireless receiver, a logic subsystem, and a storage subsystem. The storage subsystem comprises instructions executable by the logic subsystem to, in a first mode in which a keyboard satisfies a detection condition of the touch sensor, detect, via the touch sensor, input applied to the keyboard, and, in a second mode in which the keyboard does not satisfy the detection condition of the touch sensor, receive input from the keyboard via the wireless receiver, the input being detected at least in part by the keyboard operating in the second mode.

18 Claims, 7 Drawing Sheets

(56) References Cited

U.S. PATENT DOCUMENTS

| | | |
|---|---|---|
| 8,258,986 B2 | 9/2012 | Makovetskyy |
| 8,988,355 B2 | 3/2015 | Solomon et al. |
| 9,285,837 B2 | 3/2016 | Meierling et al. |
| 9,363,253 B2 | 6/2016 | Sangster et al. |
| 9,465,446 B2 | 10/2016 | Kaiser et al. |
| 9,507,517 B2* | 11/2016 | Kim ................ G06F 3/0481 |
| 9,638,731 B2 | 5/2017 | Hu et al. |
| 10,989,978 B1* | 4/2021 | Tsen ................ G06F 3/04886 |
| 2009/0033628 A1 | 2/2009 | Srivastava |
| 2010/0039764 A1 | 2/2010 | Locker et al. |
| 2010/0238119 A1 | 9/2010 | Dubrovsky et al. |
| 2011/0241999 A1 | 10/2011 | Thier et al. |
| 2011/0248947 A1 | 10/2011 | Krahenbuhl et al. |
| 2013/0129398 A1 | 5/2013 | Koepke |
| 2014/0204519 A1 | 7/2014 | Wu |
| 2016/0320810 A1* | 11/2016 | Kim ................ G06F 1/1677 |
| 2018/0307332 A1 | 10/2018 | Stone et al. |
| 2018/0329622 A1* | 11/2018 | Missig ............ G06F 3/04886 |
| 2020/0319679 A1* | 10/2020 | Knoppert ........ G06F 1/1626 |

FOREIGN PATENT DOCUMENTS

| | | |
|---|---|---|
| KR | 20160089675 A | 7/2016 |
| WO | 2015200726 A2 | 12/2015 |

OTHER PUBLICATIONS

"Search Report Issued in Netherlands Patent Application No. N2024026", Mailed Date: Jul. 28, 2020, 13 Pages.

"International Search Report and Written Opinion Issued in PCT Application No. PCT/US20/055197", Mailed Date: Feb. 15, 2021, 13 Pages.

"International Search Report and Written Opinion Issued in PCT Application No. PCT/US20/055197", Jan. 13, 2021, 13 Pages.

"Notice of Allowance Issued in European Patent Application No. 20797355.3", Mailed Date: Sep. 6, 2023, 8 Pages.

First Office Action Received for Chinese Application No. 202080072729.3, mailed on Apr. 26, 2024, 13 pages. (English Translation Provided).

Office Action Received for Indian Application No. 202247014849, mailed on Aug. 29, 2024, 7 pages.

* cited by examiner

KEYBOARD FOR TOUCH-SENSITIVE DISPLAY DEVICE

CROSS REFERENCE TO RELATED APPLICATIONS

The present application is a U.S. National Phase of International Patent Application Serial No. PCT/US2020/055197 entitled "KEYBOARD FOR TOUCH-SENSITIVE DISPLAY DEVICE", filed Oct. 12, 2020, which claims priority to Netherlands Patent Application Serial No. 2024026, filed Oct. 16, 2019, the entire contents of each of which are hereby incorporated by reference for all purposes.

BACKGROUND

Touch-sensitive input devices enable the reception of touch input, such as input applied by a finger or stylus. Some touch-sensitive input devices enable typing via touch input through the display of a virtual keyboard. Alternatively, a physical keyboard may be used to type input at a touch-sensitive input device.

SUMMARY

Examples are disclosed that relate to keyboard for a touch-sensitive display device. In one example, a system comprises a keyboard and a touch-sensitive display device. The touch-sensitive display device comprises a touch sensor, a display, a wireless receiver, a logic subsystem, and a storage subsystem. The storage subsystem comprises instructions executable by the logic subsystem to, in a first mode in which the keyboard satisfies a detection condition of the touch sensor, detect, via the touch sensor, input applied to the keyboard, and in a second mode in which the keyboard does not satisfy the detection condition of the touch sensor, receive input that was applied to the keyboard via the wireless receiver, the input being detected at least in part by the keyboard operating in the second mode.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Touch-sensitive input devices enable the reception of touch input, such as input applied by a finger or stylus. Some touch-sensitive input devices enable typing via touch input through the display of a virtual keyboard. The virtual keyboard includes virtual keys each selectable by applying touch input at the displayed location corresponding to that key. Virtual keyboards pose drawbacks that may adversely affect typing, however, such as erroneous key selection due to a discrepancy between intended and detected touch locations, lack of tactile feedback, and sluggish visual feedback in response to key presses. As such, a physical keyboard including mechanically depressible keys may be used to type input at a touch-sensitive input device. The physical keyboard may be provided in the form of an overlay positioned over a touch-sensitive input device, for example. Key presses at the overlay produce signals detectable by a touch sensor of the input device, for example by creating contact with the input device detectable as touch input (e.g., via capacitance measurement). Such overlays become inoperative when moved away from the input device, however, limiting potential use cases.

Accordingly, examples are disclosed that relate to a keyboard operable to provide input to a touch-sensitive display device both when overlaid on the display device and when spaced away from the display device. When spaced away from the display device, typing is detected by the keyboard and relayed to the display device via a wireless transmitter. When overlaid on the display device, typing is detected by a touch sensor of the display device. With input detected by the display device, the wireless transmitter of the keyboard may be powered down. As such, the keyboard is usable in different arrangements relative to the display device, with reduced power consumption and increased battery life through selective enablement of the wireless transmitter. Other examples provide a hybrid mode of operation in which typing at some keys is detected via the display device touch sensor, while typing at other keys is detected by the keyboard and transmitted to the display device via the wireless transmitter. The hybrid mode thus provides robust typing detection, for example where input detection at the keyboard or display device has degraded, and a mechanism with which detection of typing at the touch sensor can be verified.

Figure 1A:
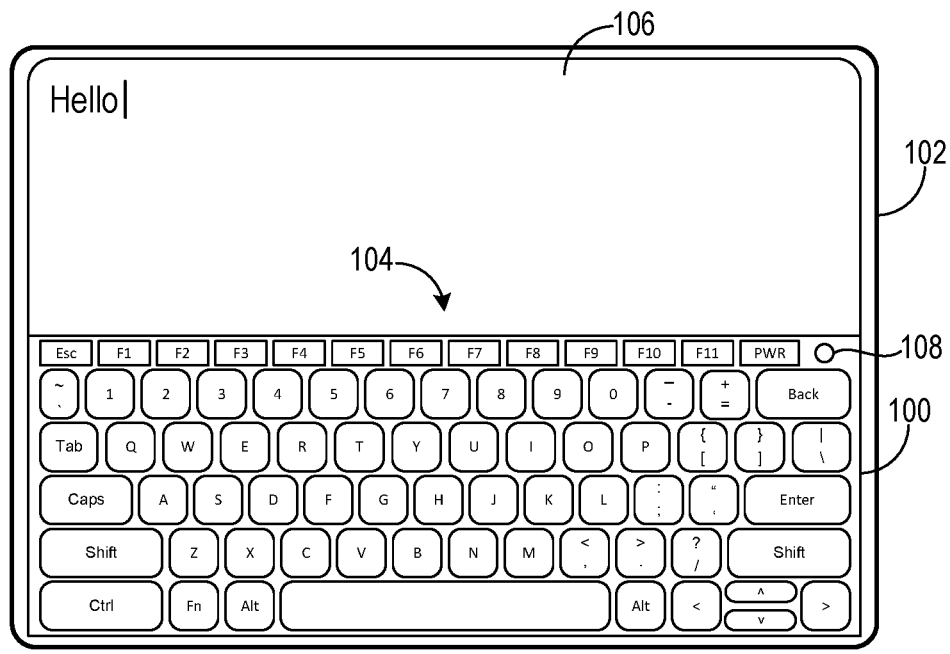
FIGS. 1A-1B show respective arrangements between an example touch-sensitive display device and an example keyboard.
Figure 1B:
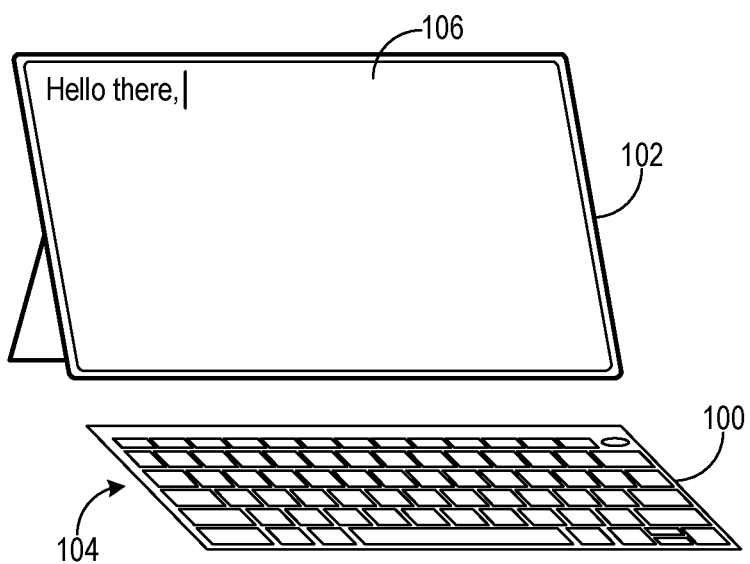

FIGS. 1A-1B show a keyboard 100 operable to provide input to a touch-sensitive display device 102. Keyboard 100 includes a plurality of keys 104 each selectable to provide a corresponding input to display device 102. In the depicted example, keyboard 100 is used to provide alphanumeric input to a word processing application executing on display device 102. However, keyboard 100 may provide any suitable input to display device 102, including but not limited to non-alphanumeric characters, input effecting functions of applications/operating systems executing on the display device, and input effecting functions of the display device itself.

Figure 2:
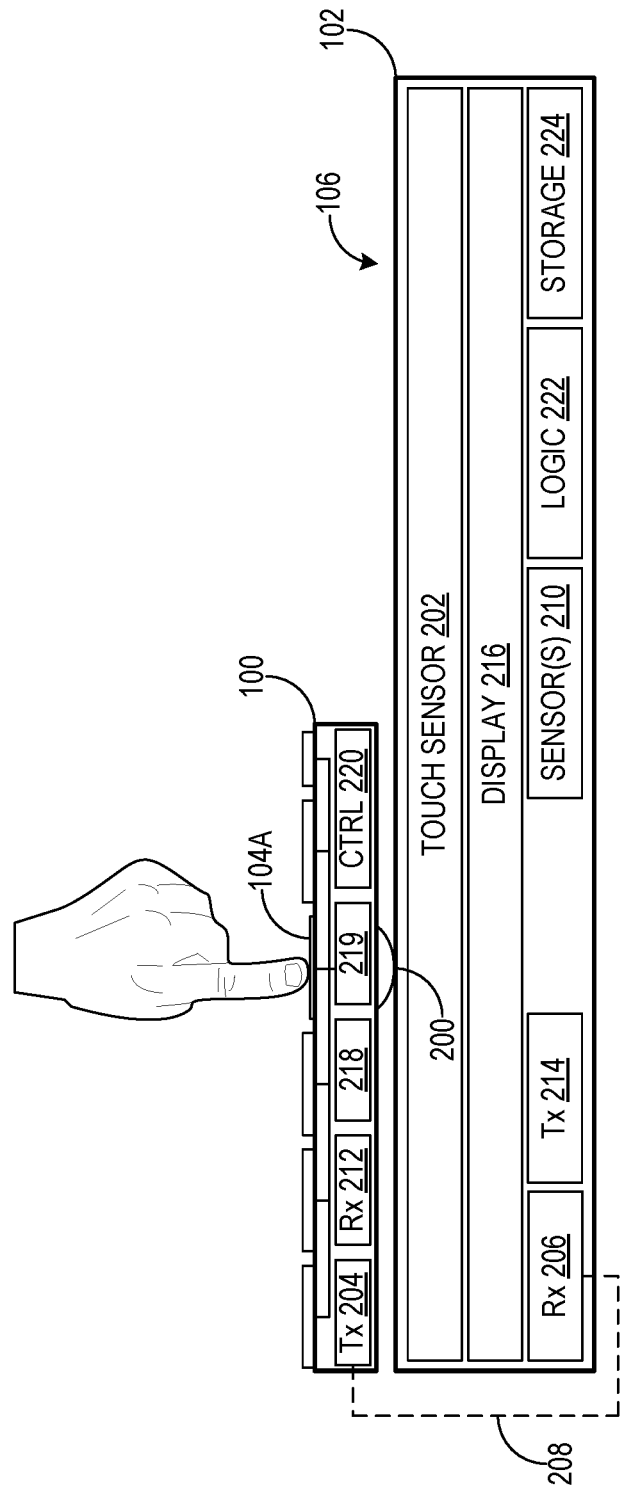
FIG. 2 schematically shows an example implementation of the touch-sensitive display device and keyboard of FIGS. 1A-1B.

Keyboard 100 is usable in different orientations relative to display device 102. In FIG. 1A, keyboard 100 is positioned over display device 102 and in sufficient physical proximity to the display device such that a touch sensor of the display device can detect input applied to the keyboard. Actuation of each key 104 may cause contact between a depressible pad coupled to that key (e.g., on its underside) and a touch surface 106 of display device 102, where such contact may be detected by the touch sensor as a touch input, e.g., via capacitance measurement. FIG. 2 illustrates one such implementation in which the actuation of a key 104A causes a depressible pad 200 coupled to the key to contact touch surface 106. A touch sensor 202 of display device 102 detects such contact as a touch input, e.g., via recognizing a change in capacitance produced by the presence of the pad. With knowledge of the orientation of keyboard 100 relative to display device 102 gained as described below, the display device can then map the detected location of this touch input to the corresponding key and effect the functionality assigned to that key.

As shown in FIG. 1B, keyboard 100 is also usable when positioned away from display device 102. In this relative arrangement, the separation of keyboard 100 from display device 102 may render touch sensor 202 unable to detect input applied to the keyboard. However, typing at keyboard 100 can continue to be received at display device 102 by detecting, at the keyboard, input applied to the keyboard and transmitting detected input from the keyboard to the display device. As shown in FIG. 2, keyboard 100 includes a wireless transmitter 204 with which input detected at the keyboard is transmitted to a wireless receiver 206 of display device 102 along a wireless communication link 208 to thereby enable keyboard operation away from the display device. Componentry with which keyboard 100 may detect typing is described below with reference to FIG. 2.

The detection of keyboard input by touch sensor 202 occurs in what is referred to herein as a "first mode" of operation. In the first mode, keyboard 100 satisfies a detection condition of touch sensor 202. The detection condition may be defined such that input applied to keyboard 100 can be detected by touch sensor 202. In some examples, the detection condition may be defined in terms of the physical proximity between keyboard 100 and touch sensor 202. When the detection condition is satisfied as defined in this manner, the physical proximity between keyboard 100 and touch sensor 202 is such that the touch sensor is capable of detecting keyboard input with a desired level of accuracy. In some examples, the detection condition may include contact between keyboard 100 and touch surface 106, such as the contact between pad 200 and touch surface 106 resulting from the depression of key 104A. In these examples, touch sensor 202 may identify satisfaction of the detection condition by detecting the touch input corresponding to contact by pad 200 and engage the first mode in response. However, FIG. 2 is not drawn to scale, and keyboard 100 may be in contact with touch surface 106 without any key 104 being depressed—for example, pads 200 of the keys and/or a frame of the keyboard may be in contact with the touch surface with the keyboard overlaid on display device 102.

Satisfaction of the detection condition of touch sensor 202 may be detected in any suitable manner. Where touch sensor 202 is implemented as a capacitive touch sensor, the capacitive influence caused by the proximity of keyboard 100 to the touch sensor may be detected. In capacitive implementations, touch sensor 202 may include a plurality of electrodes that are charged by drive circuitry, with those electrodes (e.g., in self-capacitive implementations) or a separate set of electrodes (e.g., in mutual capacitive implementations) coupled to receive circuitry configured to measure the capacitance and/or other electrical properties of the coupled electrodes. The receive circuitry may detect changes in electrode capacitance that indicate the proximity of keyboard 100. Further, changes in electrode capacitance may be localized to determine a location of touch input, which may be mapped to a particular key 104, or for other input devices contacting touch surface 106 such as a finger or stylus, to determine a location of such input devices. In some examples, touch sensor 202 may employ first scan setting(s) to detect finger input, and second scan setting(s) different from the first scan setting(s) to detect keyboard input. Examples of scan settings that may be varied include drive signals used to drive electrodes, correlation sequences with which signals received via receive circuitry are correlated, scan locations, and scan timing. While described in terms of capacitive implementations, touch sensor 202 may implement other touch sensing technologies, such as resistive, acoustic, and optical touch-sensing technologies. Further, touch sensor 202 may detect hover input in addition to touch input—i.e., input applied by an input device in proximity to, but not in contact with, touch surface 106. "Touch input" as used herein thus refers to both touch input and hover input.

Display device 102 may employ other mechanisms alternatively or in addition to touch sensor 202, to detect satisfaction of the detection condition and/or other information regarding input. To this end, FIG. 2 shows the inclusion of one or more sensors 210 in display device 102, which may comprise an ambient light sensor configured to detect the presence of keyboard 100 by way of variation in ambient light caused by occlusion of the display device by the keyboard. The ambient light sensor may be implemented under cover glass of display device 102, in combination with an opening and mask, for example. As further examples, sensor(s) 210 may include an image sensor (e.g., as part of a camera) that detects the presence of keyboard 100 via image data, and/or an infrared sensor that detects keyboard presence via infrared data. Other sensors that detect electromagnetic influence from keyboard presence may be used, including a Hall effect sensor, magnetic sensor, and wireless charging coil.

As another example, sensor(s) 210 may include a pressure sensor configured to detect the presence of keyboard 100 by way of the pressure applied by the keyboard to display device 102. However, touch sensor 202 may capacitively detect pressure through variation in the distance between electrode layers, potentially in combination with a deformable layer. In yet further examples, display device 102 may observe the presence of keyboard 100 by detecting, via a wireless receiver 206, a wireless signal emitted from wireless transmitter 204 of the keyboard. The wireless signal may explicitly identify the presence of keyboard 100, or may implicitly identify keyboard presence—for example, display device 102 may detect that a magnitude or signal-to-noise ratio (SNR) of the signal is above a threshold, thereby implying keyboard presence.

In some implementations, keyboard 100 may detect satisfaction of the detection condition of touch sensor 202, alternatively or in addition performing such detection at display device 102. For example, keyboard 100 may detect, via a wireless receiver 212, a wireless signal emitted by a wireless transmitter 214 of display device 102, and potentially that a magnitude or SNR of the signal is greater than a threshold. The wireless signal may be a carrier signal or any other suitable signal. As another example, keyboard 100 may detect signals emitted by or used to drive touch sensor 202. In capacitive implementations of touch sensor 202, keyboard 100 may include receive circuitry configured to detect capacitive signals used to drive the touch sensor, for example. In yet other examples, touch surface 106 of display device 102 may be coated with a conductive material such that keyboard 100 can detect its proximity to the display device upon a pad 200 of a depressed key 104 making contact with the conductive material. Keyboard 100 may communicate satisfaction of the detection condition to display device 102 via wireless transmitter 204 or via any other suitable mechanism.

Figure 3:
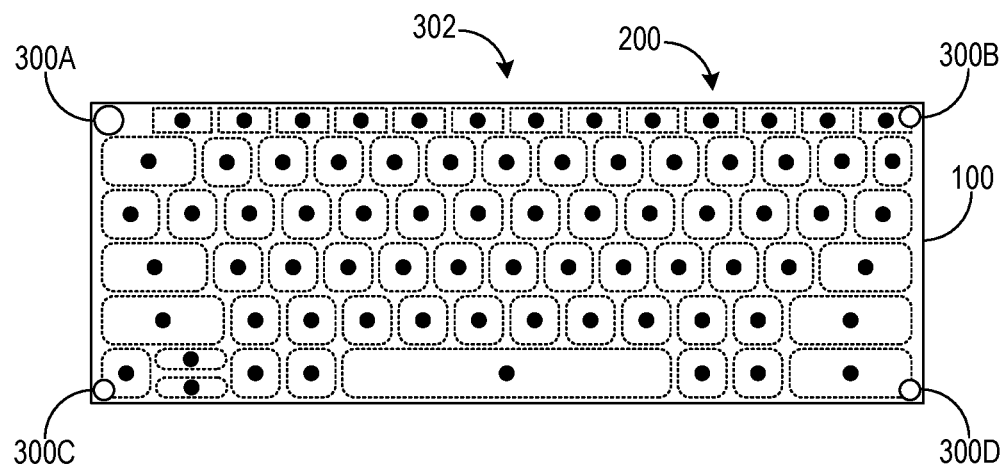
FIG. 3 shows a rear view of the keyboard of FIGS. 1A-1B.

In the first mode of operation in which keyboard 100 satisfies the detection condition of touch sensor 202, display device 102 may detect the orientation of the keyboard relative to the touch sensor. FIG. 3 illustrates one example mechanism by which the relative orientation of keyboard 100 may be detected by display device 102. In the depicted example, which shows keyboard 100 from a rear side opposite the key-side depicted in FIGS. 1A and 1B, the keyboard includes four markers 300 affixed to a rear surface 302 of the keyboard. Markers 300 may provide patterns that are capacitively and/or optically detectable by touch sensor 202 and/or sensor(s) 210, for example. Further, markers 300 may be distinguishable from one another—in the depicted example this is achieved by rendering marker 300A different from markers 300B, 300C, and 300D—e.g., rendering marker 300A larger than markers 300B-300D, and/or with a different capacitive/optical pattern than markers 300B-300D. With marker 300A distinguishable from markers 300B-300D, the orientation of keyboard relative to touch sensor 202 can be accurately determined.

Via their detectability by display device 102, markers 300 provide a mechanism by which satisfaction of the touch sensor detection condition can be identified, and a mechanism to determine the orientation of keyboard 100 relative to touch sensor 202. Accordingly, detecting satisfaction of the detection condition, and determining the orientation of keyboard 100, may be performed in a combined process using common mechanisms to carry out both tasks. The relative orientation of keyboard 102 may be determined via any suitable techniques, however, including based on output from sensor(s) 210—for example, from one or more of the Hall effect sensor, magnetic sensor, and wireless charging coil described above. Another method of determining the relative orientation may include transmitting, from keyboard 100 to display device 102, an identity of a depressed key, detecting at the display device the touch input corresponding to depression of the key, and mapping the identity of the key to the detected touch input location.

In some examples, the detection of markers 300 may yield the orientation of a boundary of keyboard 100 relative to touch sensor 202. In this case, display device 102 may combine the orientation of the boundary with predetermined knowledge of the layout of keys 104 in keyboard 100 to determine the orientation of each key relative to touch sensor 202, enabling touch inputs to be accurately mapped to corresponding keys. This predetermined knowledge may be transmitted from keyboard 100 to display device 102 or may be stored on the display device, as examples. Other mechanisms by which touch inputs are mapped to corresponding keys 104 are possible—for example, each pad 200 may include a unique pattern detectable by touch sensor 202 and/or sensor(s) 210 that identifies the key to which the pad is coupled. Identification of a key 104 via the corresponding unique pattern may yield the identity of the other keys if their relative position to the identified key is known. The unique patterns may also provide inputs distinguishable from those created by fingers and/or styluses, for example, enabling accurate identification of the input device providing touch input to display device 102. In yet other examples, keyboard 100 may include a single marker 300 that, combined with knowledge of the boundary of the keyboard, yields the orientation of the keyboard relative to touch sensor 202. For example, a rectangular boundary of keyboard 100 along with the position of a marker 300 arranged at the corner of the keyboard may be determined to detect the keyboard orientation.

Figure 4A:
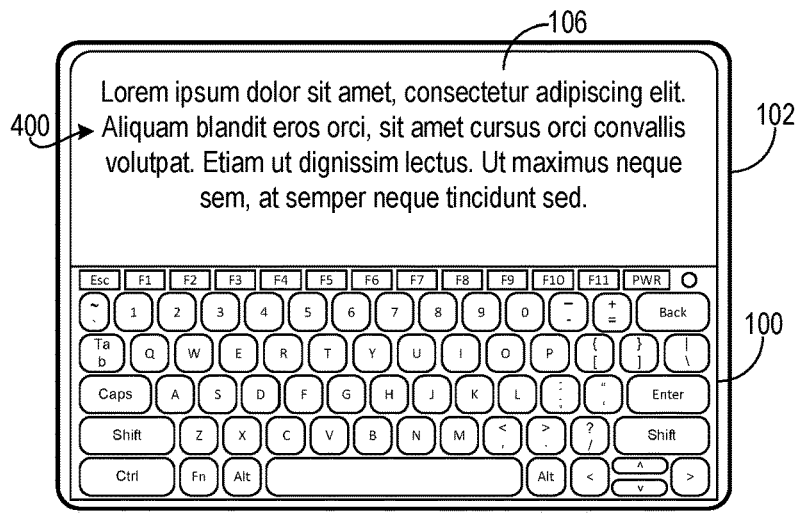
FIGS. 4A-4C show the display of an example user interface on the touch-sensitive display device of FIGS. 1A-1B.
Figure 4B:
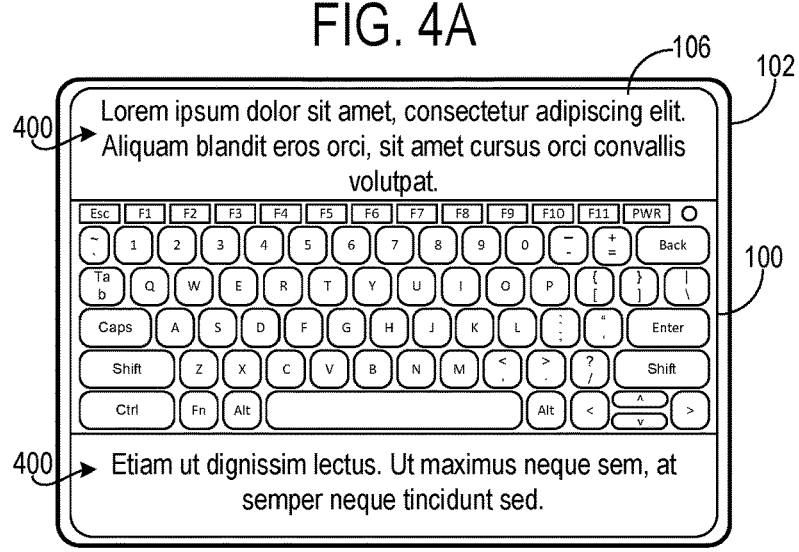
Figure 4C:
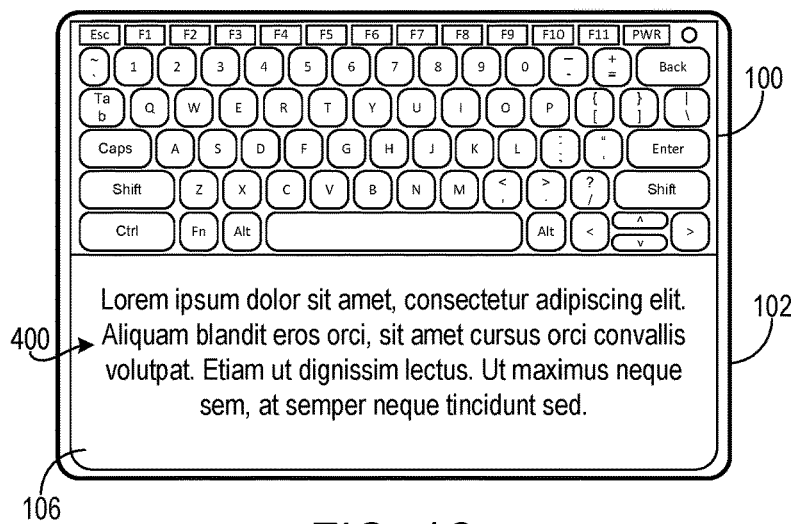

In addition to informing how touch inputs are mapped to keys 104, the orientation of keyboard 100 relative to touch sensor 202 may influence the output of a user interface on a display 216 of display device 102. FIGS. 4A-4C illustrate examples in which display device 102 supports variable positioning of keyboard 100, including positions in which the keyboard occupies bottom, middle, and top portions of touch surface 106. In each example, display device 102 detects the position of keyboard 100 and displays a user interface 400 at a location not occluded by the keyboard. In FIG. 4A, keyboard 100 is positioned at the bottom portion of touch surface 106, with user interface 400 accordingly being rendered at the top portion of display 216. In FIG. 4B, keyboard 100 is positioned at the middle portion of touch surface 106, with user interface 400 accordingly being rendered at the top and bottom portions of display 216. In FIG. 4C, keyboard 100 is positioned at the top portion of touch surface 106, with user interface 400 accordingly being rendered at the bottom portion of display 216.

Keyboard 100 may be arranged in positions and orientations other than those depicted in FIG. 4A-4C. For example, keyboard 100 may be rotated (e.g., approximately 90 degrees) and laid atop left, right, or other portions of touch surface 106. In other examples, keyboard 100 may be placed at oblique angles. In such examples, a subset of keys 104 may hang off touch surface 106, rendering touch sensor 202 unable to accurately detect input applied to those keys. In this case, keyboard 100 and touch sensor 202 may cooperate to detect input across all keys 104 in what is referred to as a "hybrid mode" of operation described in further detail below.

In other examples, a physical mechanism may be provided at keyboard 100 and/or display device 102 that restrains or otherwise biases the keyboard in a particular position/orientation relative to the display device when the keyboard is placed over the display device and used in the first mode. With the position/orientation of keyboard 100 constrained in this manner, detecting the keyboard position/orientation at display device 102 may include detecting that the keyboard is positioned over the display device (e.g., without determining the location of capacitive/optical markers or the keyboard boundary). As examples, the physical mechanism may include magnets provided in keyboard 100 and display device 102, and/or one or more recesses in the frame of the display device that receive hooks or other protruding elements at the keyboard to thereby releasably restrain the keyboard against the display device.

As the detection of typing at keyboard 100 is serviced by touch sensor 202 in the first mode, components within the keyboard configured to detect typing at the keyboard and wirelessly communicate with display device 102—to thereby enable typing with the keyboard spaced away from the display device—may be disabled in the first mode. For example, keyboard 100 may include scan circuitry 219 coupled to keys 104 and configured to actively scan the keys for depression. Scan circuitry 219 and thus scanning of keys 104 at keyboard 100 may be disabled in the first mode. Where scan circuitry 219 is provided on a per-key basis, the scan circuitry may be disabled for some keys 104 and not others. Any suitable mechanism may be used to detect typing at keyboard 100, however, including scan circuitry that passively detects typing (e.g., where the depression of keys causes actuation of a switch thereby generating a signal indicating depression). Further, wireless transmitter 204 and/or wireless receiver 212 of keyboard 100 may be disabled in the first mode. Disabling components of keyboard 100 in the first mode may reduce consumption of charge stored in a battery 218 configured to power keyboard 100, and thereby extend the operational lifetime of the keyboard for a given battery charge.

To enable and disable components of keyboard 100, and generally effect keyboard operation as described herein, the keyboard includes a controller 220 configured to control operation of wireless transmitter 204, wireless receiver 212, battery 218, scan circuitry 219, and other potential components. Controller 220 may enable and disable keyboard components upon determining whether the detection condition of touch sensor 202 is satisfied. In other examples, controller 202 may enable and disable keyboard components in response to receiving, via wireless receiver 212, signals from display device 102 causing enablement/disablement. In these examples, wireless receiver 212 may continue to be enabled throughout operation of keyboard 100 to facilitate reception of such signals. On the other side, display device 102 includes a logic subsystem 222 and a storage subsystem 224 comprising instructions executable by the logic subsystem to effect operation of the display device as described herein. Logic subsystem 222 may control touch sensor 202, wireless receiver 206, sensor(s) 210, wireless transmitter 214, and display 216 for example. Example implementations of controller 220, logic subsystem 222, and storage subsystem 224 are described below with reference to FIG. 8.

As described above and as illustrated in FIG. 1B, keyboard 100 is operable to provide input when spaced away from display device 102 by detecting typing at the keyboard and wirelessly transmitting detected input to the display device in what is referred to herein as a "second mode" of operation. In the second mode, keyboard 100 does not satisfy the detection condition of touch sensor 202. For example, where the detection condition is defined in terms of the physical proximity between keyboard 100 and touch sensor 202 as described above, the detection condition may not be satisfied due to a lack of such physical proximity between the keyboard and touch sensor.

The second mode may be engaged in response to determining that the touch sensor detection condition is not satisfied. In view of the methods described above for determining that the detection condition is satisfied, this determination may be carried out at keyboard 100 and/or display device 102. With respect to display device 102, the display device may detect that the detection condition is not satisfied based on an absence/lack of presence of a capacitive, electromagnetic, optical, and/or pressure influence from keyboard 100. For example, display device 102 may detect an absence of one or more markers 300 in capacitive measurements captured by touch sensor 202. Alternatively or additionally, display device 102 may detect an absence of keyboard 100 in ambient light data, image data, infrared data, and/or pressure data via output from sensor(s) 210. Further, display device 102 may detect an absence of keyboard 100 by observing, at wireless receiver 206, an absence of a wireless signal emitted from wireless transmitter 204 of the keyboard. Alternatively, display device 102 may detect a wireless signal emitted from wireless transmitter 204 that indicates keyboard 100 is spaced away from the display device—for example, the signal may explicitly indicate such lack of proximity (e.g., in implementations where the keyboard detects whether the detection condition is satisfied), or may exhibit noise exceeding a threshold that implicitly indicates lack of proximity.

With respect to determining at keyboard 100 that the detection condition is not satisfied, the keyboard may make such determination in response to observing, at wireless receiver 212, an absence of a sufficiently strong wireless signal emitted from display device 102 via wireless transmitter 214. This signal may serve as a proxy for the physical proximity between keyboard 100 and display device 102; where the signal is insufficiently strong, the keyboard-display physical proximity is insufficient to support operation in the first mode. However, the wireless signal may be at least somewhat orthogonal to the quality of wireless communication between keyboard 100 and display device 102 in the second mode. In other words, an insufficiently strong wireless signal may indicate insufficient physical proximity for operation in the first mode, yet the physical proximity may be sufficient to support operation in the second mode. Alternatively or additionally, where keyboard 100 includes receive circuitry operable to detect capacitive signals used to drive touch sensor 202, the keyboard may determine that the detection is not satisfied in response to observing, via the receive circuitry, an absence of such capacitive drive signals or the presence of capacitive drive signals with noise exceeding a threshold.

In some implementations noted above, display device 102 may cause wireless transmitter 204 of keyboard 100 to be disabled in the first mode of operation, and cause the wireless transmitter to be enabled in the second mode. To this end, display device 102 may send, via wireless transmitter 214, signals that when received by wireless receiver 212 of keyboard 100, respectively cause enablement and disablement of wireless transmitter 204. Disabling wireless transmitter 204 in the first mode reduces consumption of charge stored by battery 218 while continuing to enable the detection of typing at keyboard 100.

With regard to the charge state of battery 218, keyboard 100 may output an indication regarding the charge state. Returning to FIG. 7A, keyboard 100 may include a light-emitting diode (LED) 108 configured to indicate the charge state of battery 218—for example, LED 108 may emit light in response to the battery charge falling below a threshold charge. When keyboard 100 is used away from display device 102 in the second mode of operation, the emission of light from LED 108 may provide a suggestion to a user to position the keyboard over the display device so that the keyboard can be used in the first mode of operation. In some examples, display device 102 may charge battery 218 when keyboard 100 is used in the first mode (e.g., via the wireless charging coil described above). Further, display device 102 may output an indication of the charge state of battery 218—for example, via graphical output shown on display 216, which may indicate the charge level falling below a threshold and/or a charge level or charge percentage.

Figure 5:
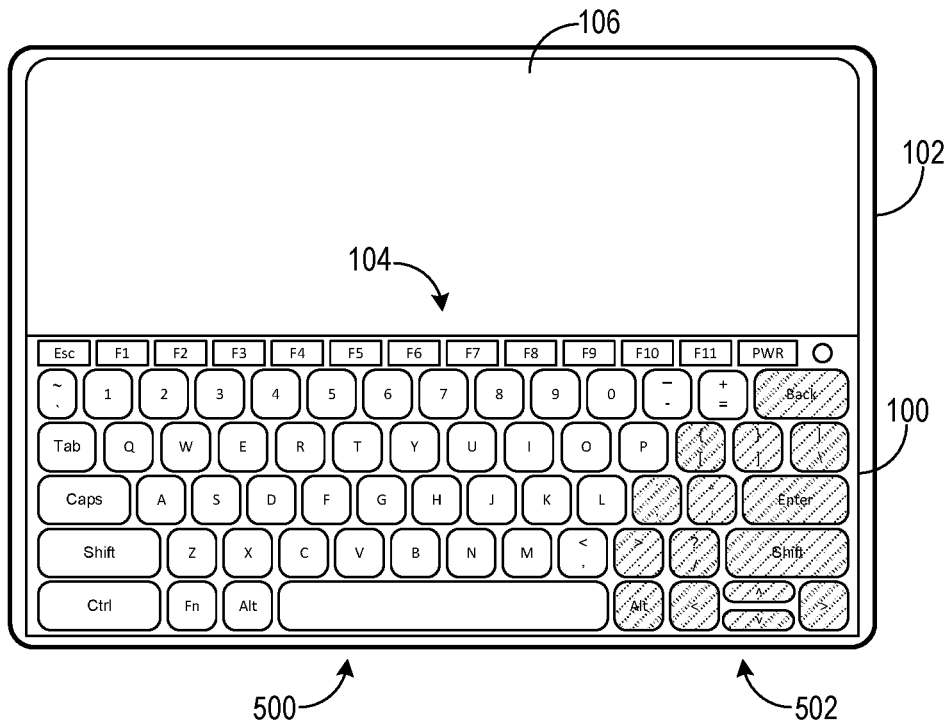
FIG. 5 shows an example depicting operation of the touch-sensitive display device and keyboard of FIGS. 1A-1B in a hybrid mode.

As alluded to above, a third mode of operation is possible in which the detection of typing at keyboard 100 is distributed between the keyboard and display device 102. FIG. 5 illustrates one example of operation in this "hybrid mode", in which input applied to a first subset 500 of keys 104 (unshaded) is detected via touch sensor 202, and a second subset 502 of the keys (shaded) is detected via keyboard 100 and transmitted to display device 102 via wireless transmitter 204. In this example, first subset 500 satisfies the detection condition of touch sensor 202, while second subset 502 does not satisfy the touch sensor detection condition, despite keyboard 100 being placed atop display device 102 in physical proximity to the touch sensor. The failure of second subset 502 in satisfying the detection condition may occur for various reasons. For example, the operation of touch sensor 202 may have degraded in the region occupied by second subset 502—e.g., due to age or electromagnetic interference temporarily interrupting touch sensor operation. As another example, keys of second subset 502 may be unable to provide touch inputs detectable by touch sensor 202 (e.g., due to physical degradation of their pads 200 or corresponding actuation mechanisms), prompting their detection by keyboard 100.

Figure 6:
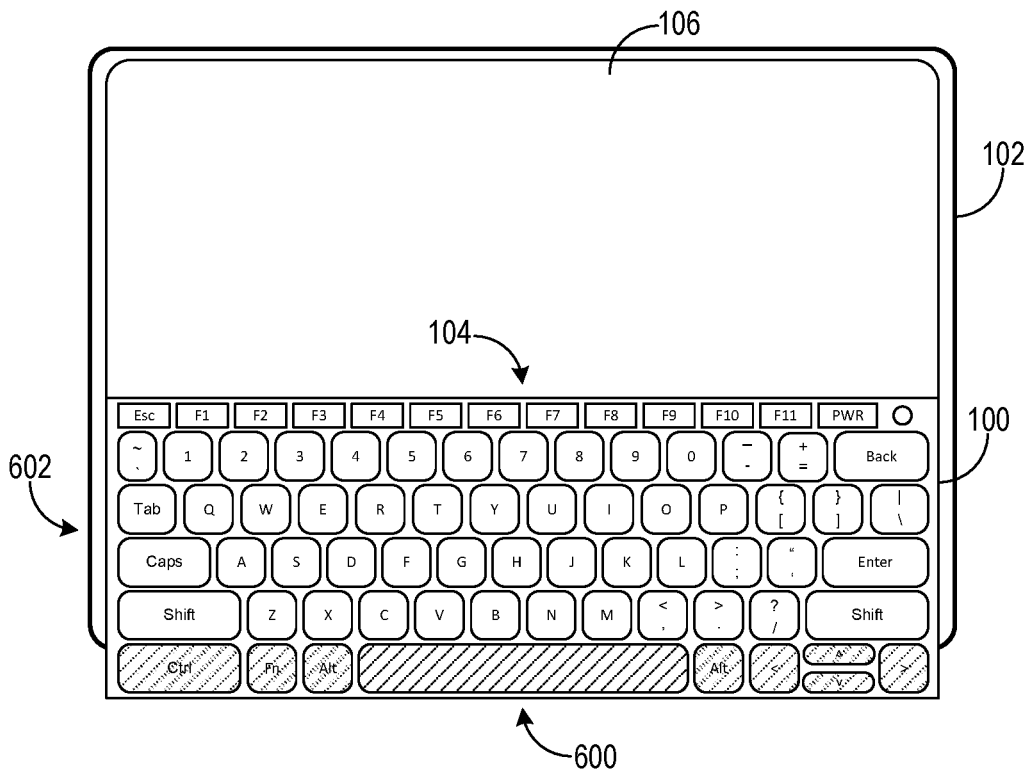
FIG. 6 shows another example depicting operation of the touch-sensitive display device and keyboard of FIGS. 1A-1B in the hybrid mode.

FIG. 5 depicts the entirety of keyboard 100 occupying touch surface 106. However, scenarios are possible in which the failure of a subset of keys to satisfy the touch sensor detection condition may arise from positioning the keyboard such that the key subset is not within sufficient physical proximity to touch sensor 102 for the touch sensor to detect input applied to the key subset. FIG. 6 illustrates one such example in which keyboard 100 is positioned such that a first subset 600 of keys 104 (shaded) hangs off touch surface 106, and as such does not satisfy the touch sensor detection condition. Accordingly, input at first subset 600 is detected by keyboard 100 and transmitted to display device 102. A second subset 602 of keys 104 (unshaded) remains on touch surface 106 and satisfies the touch sensor detection condition. Accordingly, input at second subset 602 is detected via touch sensor 202. Other positions/orientations of keyboard 100 may cause a subset of keys 104 unable to satisfy the touch sensor detection condition—for example, the keyboard may be placed at an oblique angle relative to display device 102 such that the subset of keys hangs off touch surface 106.

To identify scenarios in which a subset of keys 104 does not satisfy the touch sensor detection condition, while another subset of keys does satisfy the detection condition, display device 102 may determine the orientation of keyboard 100 relative to touch sensor 202 in the manners described above. The absence of one or markers 300, where the presence of all markers is expected, may indicate that a subset of keys hangs off touch surface 106 and thus cannot be detected by touch sensor 202. Another method of identifying keys 104 that do not satisfy the touch sensor detection condition includes detecting, at keyboard 100, a test input applied to a particular key, transmitting the test input to display device 102 via wireless transmitter 204, and then subsequently determining, at display device 102, whether the test input applied to that key was also detected by touch sensor 202. This verification mechanism may be performed for any number of keys 104, and in some examples all keys, to identify keys where inputs cannot be detected by touch sensor 202.

The verification mechanism may also be used to determine whether the instant mode in which keyboard 100/display device 102 are operating in is working as expected, or to engage a different mode of operation. For example, the verification mechanism may be performed at periodic intervals to ensure proper operation of an operating mode, or in response to any suitable trigger, such as request to perform the mechanism (e.g., issued via a user input, or initiated by keyboard 100 or display device 102). With regard to changing the instant operational mode, the verification mechanism may be used to cease operation in the second mode and engage the first mode, for example in response to detecting that typing is successfully detected at touch sensor 202, or to transition from the first mode to the hybrid mode for keys 104 where input is not detected at touch sensor 202. The verification mechanism may also be performed the first mode to verify its correct operation, and to transition from the first mode to the second mode if typing is not detected at touch sensor 202. The verification mechanism may also be used to continue operation in the second mode in response to detecting that typing is not detected at touch sensor 202.

In the hybrid mode, various features of keyboard 100 may be disabled. For example, for keys 104 detected by touch sensor 202 and not keyboard 100, scanning of those keys by the keyboard may be disabled (e.g., where per-key scan circuitry is provided, by disabling the scan circuitry for those keys). Alternatively or additionally, the transmission of wireless signals from wireless transmitter 204 indicating input at those keys may be disabled. The transmission of wireless signals from wireless transmitter 204 indicating input at other keys where input is detected by keyboard 100 may continue, however. Reducing, but not entirely disabling, wireless transmission from keyboard 100 in this manner may reduce bandwidth and power consumption at the keyboard. Further, various features of display 102 may be disabled in the hybrid mode. For example, touch sensor 202 may disable scanning in regions corresponding to keys 104 where input is detected by keyboard 100 and not the touch sensor.

Figure 7:
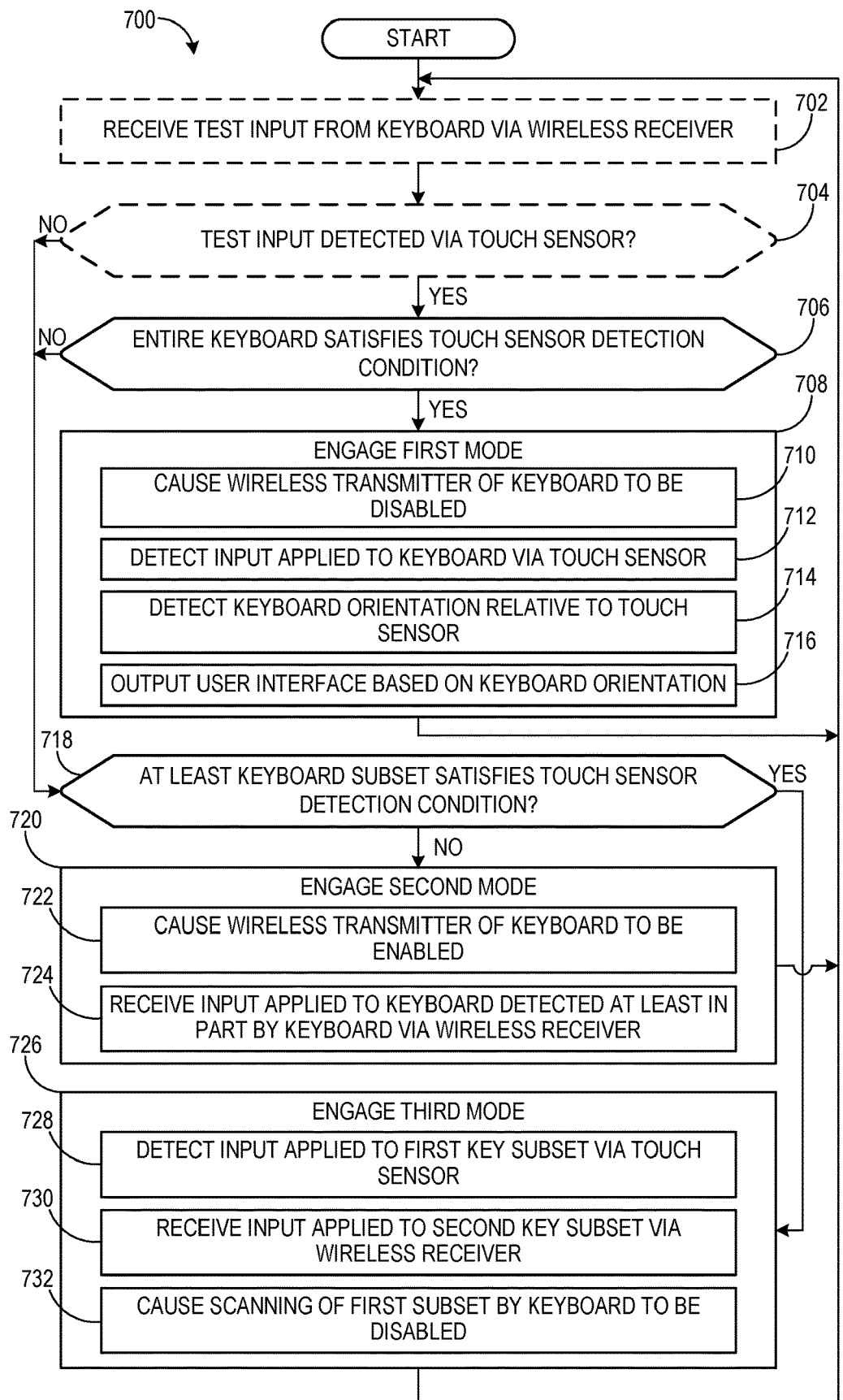
FIG. 7 shows a flowchart illustrating an example method of receiving keyboard input at a touch-sensitive display device.

FIG. 7 shows a flowchart illustrating a method 700 of receiving, at a touch-sensitive display device, input applied to a keyboard. Method 700 may be implemented at display device 102 to receive input from keyboard 100, for example.

At 702, method 700 optionally includes receiving a test input from the keyboard via a wireless receiver of the display device. The test input may identify the key that when pressed caused generation of the test input. At 704, method 700 optionally includes determining whether the test input was detected via a touch sensor of the display device. If the test input was not detected by the touch sensor (NO), method 700 proceeds to 718.

At 706, method 700 includes determining whether the entirety of the keyboard satisfies a detection condition of the touch sensor. For example, the detection condition may be defined in terms of a minimum physical proximity between the keyboard and touch sensor such that input applied to the keyboard can be detected by the touch sensor with desired accuracy. Determining whether the detection condition is satisfied may include, at the display device, identifying the presence of one or more markers affixed to the keyboard, detecting a capacitive, electromagnetic, optical, and/or pressure influence from the keyboard, and/or detecting a wireless signal emitted by a wireless transmitter of the keyboard. Determining whether the detection condition is satisfied may include, at the keyboard, detecting a wireless signal emitted by a wireless transmitter of the display device and/or detecting a capacitive influence from the touch sensor. If the entirety of the keyboard does not satisfy the detection condition (NO), method 700 proceeds to 718. If the entirety of the keyboard does satisfy the detection condition (YES), method 700 proceeds to 708.

At 708, method 700 includes engaging a first mode of operation in which input applied to the keyboard is detected at the touch sensor and not at the keyboard. Engaging the first mode may include causing 710 the wireless transmitter of the keyboard to be disabled. The first mode may include detecting 712 input applied to the keyboard via the touch sensor. The first mode may include detecting 714 the orientation of the keyboard relative to the touch sensor. The first mode may include outputting 716 a user interface, via a display of the display device, based on the relative orientation of the keyboard.

At 718, method 700 includes determining whether at least a subset of the keyboard satisfies the detection condition. If at least the subset does satisfy the detection condition (YES), method 700 proceeds to 726. If at least the subset does not satisfy the detection condition (NO), method 700 proceeds to 720.

At 720, method 700 includes engaging a second mode of operation in which input applied to the keyboard is detected at the keyboard. Engaging the second mode may include causing 722 the wireless transmitter of the keyboard to be enabled. The second mode may include receiving 724 input applied to the keyboard, detected at least in part by the keyboard operating in the second mode, via the wireless receiver of the display device.

At 726, method 700 includes engaging a third mode of operation in which input applied to a first subset of the keyboard is detected via the touch sensor, and input applied to a second subset of the keyboard is detected by the keyboard and received, via the wireless receiver of the display device, at the touch sensor. In the third mode, the first subset of the keyboard satisfies the detection condition, and the second subset of the keyboard does not satisfy the detection condition. Thus, the second mode may include detecting 728 input applied to the first subset via the touch sensor, and receiving 730 input applied to the second subset via the wireless receiver of the display device. The second mode may include causing 732 scanning of the first subset by the keyboard to be disabled.

While shown as influencing engagement of the first mode, receiving the test input at 702 and determining whether the test input was received at 704—which may form at least part of the verification mechanism described above—may influence other actions, such as engagement/transitions to the second mode and/or third mode, alternatively or in addition to influencing engagement of the first mode. Further, the verification mechanism may be performed during operation of one or more of the described operational modes, for example to ensure proper operation in such modes. As another example, the verification mechanism may be performed in the third mode to determine whether key input is detected at the keyboard or via the touch sensor. As yet another example of how method 700 may be modified, the receiving at 702 and determining at 704 may instead be performed after the determining at 706.

The approaches described herein enable typing at a touch-sensitive display device via a keyboard usable in different positions and orientations relative to the display device. Operation in different modes enables typing detection to leverage the touch sensing capability of the display device, and the wireless communication capability of the keyboard and display device. Selective disablement of keyboard features may save power consumption, reduce bandwidth consumption by wireless communication, and reduce the potential for interference. Further, the keyboard—by virtue of its potential inclusion of physically depressible keys—may remedy issues associated with typing at virtual keyboards comprised of virtual keys.

Various modifications to the disclosed approaches are possible. For example, the touch sensor detection condition may be defined in terms of other criteria alternatively or in addition to the physical proximity between a keyboard and display device, such as noise conditions associated with a wireless communication link between the keyboard and touch sensor. In such an example, the detection condition may not be satisfied if sufficient noise is present in the wireless communication link, despite the keyboard being in sufficient physical proximity to the touch sensor for the touch sensor to detect typing at the keyboard. However, in some examples, the detection condition may be satisfied even if the keyboard is not in contact with a touch surface at which the touch sensor detects input. If touch detection by the touch sensor is sufficiently free of noise/interference, keyboard input may be detected even if its keys upon depression do not contact the touch surface. In this case, key depression may produce hover inputs over the touch surface that are detectable by the touch sensor. Generally, what satisfies the touch sensor detection condition is a relative position/orientation between the keyboard and touch sensor that enables keyboard input to be detected by the touch sensor with sufficient accuracy. As such, this relative position/orientation may manifest as direct contact or indirect contact between the keyboard and touch surface.

Further, the hybrid mode of operation may be implemented as part of the second mode of operation, rather than being considered a distinct operational mode. In such examples, input applied to the keyboard may be detected at least in part by the keyboard (e.g., at keys where the detection condition is not satisfied). Further, the keyboard and display device may implement wireless communication according to any suitable protocol, including but not limited to Bluetooth.

In some embodiments, the methods and processes described herein may be tied to a computing system of one or more computing devices. In particular, such methods and processes may be implemented as a computer-application program or service, an application-programming interface (API), a library, and/or other computer-program product.

Figure 8:
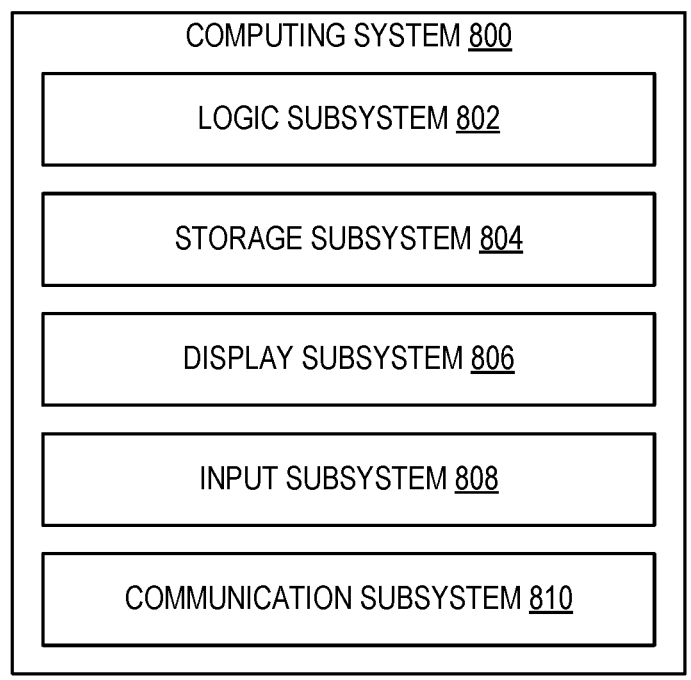
FIG. 8 shows a block diagram of an example computing system.

FIG. 8 schematically shows a non-limiting embodiment of a computing system 800 that can enact one or more of the methods and processes described above. Computing system 800 is shown in simplified form. Computing system 800 may take the form of one or more personal computers, server computers, tablet computers, home-entertainment computers, network computing devices, gaming devices, mobile computing devices, mobile communication devices (e.g., smart phone), and/or other computing devices.

Computing system 800 includes a logic subsystem 802 and a storage subsystem 804. Computing system 800 may optionally include a display subsystem 806, input subsystem 808, communication subsystem 810, and/or other components not shown in FIG. 8.

Logic subsystem 802 includes one or more physical devices configured to execute instructions. For example, the logic subsystem may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic subsystem may include one or more processors configured to execute software instructions. Additionally or alternatively, the logic subsystem may include one or more hardware or firmware logic subsystems configured to execute hardware or firmware instructions. Processors of the logic subsystem may be single-core or multi-core, and the instructions executed thereon may be configured for sequential, parallel, and/or distributed processing. Individual components of the logic subsystem optionally may be distributed among two or more separate devices, which may be remotely located and/or configured for coordinated processing. Aspects of the logic subsystem may be virtualized and executed by remotely accessible, networked computing devices configured in a cloud-computing configuration.

Storage subsystem 804 includes one or more physical devices configured to hold instructions executable by the logic subsystem to implement the methods and processes described herein. When such methods and processes are implemented, the state of storage subsystem 804 may be transformed—e.g., to hold different data.

Storage subsystem 804 may include removable and/or built-in devices. Storage subsystem 804 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage subsystem 804 may include volatile, nonvolatile, dynamic, static, read/write, read-only, random-access, sequential-access, location-addressable, file-addressable, and/or content-addressable devices.

It will be appreciated that storage subsystem 804 includes one or more physical devices. However, aspects of the instructions described herein alternatively may be propagated by a communication medium (e.g., an electromagnetic signal, an optical signal, etc.) that is not held by a physical device for a finite duration.

Aspects of logic subsystem 802 and storage subsystem 804 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 800 implemented to perform a particular function. In some cases, a module, program, or engine may be instantiated via logic subsystem 802 executing instructions held by storage subsystem 804. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 806 may be used to present a visual representation of data held by storage subsystem 804. This visual representation may take the form of a graphical user interface (GUI). As the herein described methods and processes change the data held by the storage subsystem, and thus transform the state of the storage subsystem, the state of display subsystem 806 may likewise be transformed to visually represent changes in the underlying data. Display subsystem 806 may include one or more display devices utilizing virtually any type of technology. Such display devices may be combined with logic subsystem 802 and/or storage subsystem 804 in a shared enclosure, or such display devices may be peripheral display devices.

When included, input subsystem 808 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 810 may be configured to communicatively couple computing system 800 with one or more other computing devices. Communication subsystem 810 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 800 to send and/or receive messages to and/or from other devices via a network such as the Internet.

Another example provides a touch-sensitive display device, comprising a touch sensor, a display, a wireless receiver, a logic subsystem, and a storage subsystem comprising instructions executable by the logic subsystem to, in a first mode in which a keyboard satisfies a detection condition of the touch sensor, detect, via the touch sensor, input applied to the keyboard, and, in a second mode in which the keyboard does not satisfy the detection condition of the touch sensor, receive input from the keyboard via the wireless receiver, the input being detected at least in part by the keyboard operating in the second mode. In such an example, in the first mode, a wireless transmitter of the keyboard may be disabled, and in the second mode, the wireless transmitter may be enabled such that the input is received from the wireless transmitter via the wireless receiver of the touch-sensitive display device. In such an example, the instructions alternatively or additionally may be executable to, in the first mode, cause the wireless transmitter to be disabled, and in the second mode, cause the wireless transmitter to be enabled. In such an example, the detection condition may include contact between the keyboard and a touch surface of the touch-sensitive display device. In such an example, the instructions alternatively or additionally may be executable to engage the first mode in response to detecting that the keyboard satisfies the detection condition of the touch sensor, and to engage the second mode in response to detecting that the keyboard does not satisfy the detection condition of the touch sensor. In such an example, the instructions alternatively or additionally may be executable to engage the first mode in response to detecting, via the touch sensor, a test input received from the keyboard via the wireless receiver. In such an example, the instructions alternatively or additionally may be executable to detect, in the first mode, an orientation of the keyboard relative to the touch sensor. In such an example, the instructions alternatively or additionally may be executable to output, at the display, a user interface based on the orientation of the keyboard relative to the touch sensor. In such an example, the instructions alternatively or additionally may be executable to, in a third mode in which a first subset of the keyboard satisfies the detection condition and a second subset of the keyboard does not satisfy the detection condition, detect, via the touch sensor, input applied to the first subset of the keyboard, and receive, via the wireless receiver, input applied to the second subset of the keyboard.

In such an example, the instructions alternatively or additionally may be executable to, in the third mode, cause scanning of the first subset by the keyboard to be disabled. In such an example, the touch sensor may use a first scan setting to detect finger input and a second scan setting different from the first scan setting to detect the input applied to the keyboard.

Another example provides at a touch-sensitive display device, a method, comprising, in a first mode in which a keyboard satisfies a detection condition of a touch sensor of the touch-sensitive display device, detecting, via the touch sensor, input applied to the keyboard, and in a second mode in which the keyboard does not satisfy the detection condition of the touch sensor, receiving input from the keyboard via a wireless receiver of the touch-sensitive display device, the input being detected at least in part by the keyboard operating in the second mode. In such an example, in the first mode, a wireless transmitter of the keyboard may be disabled, and in the second mode, the wireless transmitter may be enabled such that the input is received from the wireless transmitter via the wireless receiver of the touch-sensitive display device. In such an example, the detection condition may include contact between the keyboard and a touch surface of the touch-sensitive display device. In such an example, the method alternatively or additionally may comprise engaging the first mode in response to detecting that the keyboard satisfies the detection condition of the touch sensor, and engaging the second mode in response to detecting that the keyboard does not satisfy the detection condition of the touch sensor. In such an example, the method alternatively or additionally may comprise engaging the first mode in response to detecting, via the touch sensor, a test input received from the keyboard via the wireless receiver. In such an example, the method alternatively or additionally may comprise detecting, in the first mode, an orientation of the keyboard relative to the touch sensor. In such an example, the method alternatively or additionally may comprise, in a third mode in which a first subset of the keyboard satisfies the detection condition and a second subset of the keyboard does not satisfy the detection condition, detecting, via the touch sensor, input applied to the first subset of the keyboard, and receiving, via the wireless receiver, input applied to the second subset of the keyboard.

Another example provides a keyboard, comprising a plurality of keys, a wireless transmitter, and a controller configured to, in a first mode in which the keyboard satisfies a detection condition of a touch sensor, disable the wireless transmitter such that input applied to the keyboard is detected by the touch sensor, and, in a second mode in which the keyboard does not satisfy the detection condition of the touch sensor, detect input applied to the keyboard and enable the wireless transmitter such that the detected input is transmitted via the wireless transmitter to the touch sensor. In such an example, the controller alternatively or additionally may be configured to, in a third mode in which a first subset of the plurality of keys satisfies the detection condition and a second subset of the plurality of keys does not satisfy the detection condition, detect and transmit, via the wireless transmitter, input applied to the second subset, such that input applied to the first subset is detected by the touch sensor.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A system comprising a keyboard and a touch-sensitive display device, the touch-sensitive display device comprising:
    a touch sensor;
    a display;
    a wireless receiver;
    a logic subsystem; and
    a storage subsystem comprising instructions executable by the logic subsystem to:
        in a first mode in which the keyboard satisfies a detection condition of the touch sensor and a wireless transmitter of the keyboard is disabled, detect, via the touch sensor, keystroke input applied to the keyboard; and
        in a second mode in which the keyboard does not satisfy the detection condition of the touch sensor and the wireless transmitter of the keyboard is enabled, receive keystroke input that was applied to the keyboard and transmitted by the wireless transmitter of the keyboard to the wireless receiver, the keystroke input being detected at least in part by the keyboard operating in the second mode.

2. The system of claim 1, where the instructions are further executable to, in the first mode, cause the wireless transmitter to be disabled, and in the second mode, cause the wireless transmitter to be enabled.

3. The system of claim 1, where the detection condition includes contact between the keyboard and a touch surface of the touch-sensitive display device.

4. The system of claim 1, where the instructions are further executable to engage the first mode in response to detecting that the keyboard satisfies the detection condition of the touch sensor, and to engage the second mode in response to detecting that the keyboard does not satisfy the detection condition of the touch sensor.

5. The system of claim 1, where the instructions are further executable to engage the first mode in response to detecting, via the touch sensor, a test keystroke input received from the keyboard via the wireless receiver.

6. The system of claim 1, where the instructions are further executable to detect, in the first mode, an orientation of the keyboard relative to the touch sensor.

7. The system of claim 6, where the instructions are further executable to output, at the display, a user interface based on the orientation of the keyboard relative to the touch sensor.

8. The system of claim 1, where the instructions are further executable to, in a third mode in which a first subset of the keys of the keyboard satisfies the detection condition and a second subset of the keys of the keyboard does not satisfy the detection condition, detect, via the touch sensor, keystroke input applied to the first subset of the keyboard, and receive, via the wireless receiver, keystroke input applied to the second subset of the keyboard.

9. The system of claim 8, where the instructions are further executable to, in the third mode, cause scanning of the first subset by the keyboard to be disabled.

10. The system of claim 1, where the touch sensor uses a first scan setting to detect finger input and a second scan setting different from the first scan setting to detect the keystroke input applied to the keyboard.

11. A method of operating a touch-sensitive display device and a keyboard, comprising:
  in a first mode in which the keyboard satisfies a detection condition of the touch sensor of the touch-sensitive display device and a wireless transmitter of the keyboard is disabled, detecting, via the touch sensor, keystroke input applied to the keyboard; and
  in a second mode in which the keyboard does not satisfy the detection condition of the touch sensor and the wireless transmitter of the keyboard is enabled, receiving keystroke input that was applied to the keyboard and transmitted by the wireless transmitter of the keyboard to a wireless receiver of the touch-sensitive display device, the keystroke input being detected at least in part by the keyboard operating in the second mode.

12. The method of claim 11, where the detection condition includes contact between the keyboard and a touch surface of the touch-sensitive display device.

13. The method of claim 11, further comprising engaging the first mode in response to detecting that the keyboard satisfies the detection condition of the touch sensor, and engaging the second mode in response to detecting that the keyboard does not satisfy the detection condition of the touch sensor.

14. The method of claim 11, further comprising engaging the first mode in response to detecting, via the touch sensor, a test keystroke input received from the keyboard via the wireless receiver.

15. The method of claim 11, further comprising detecting, in the first mode, an orientation of the keyboard relative to the touch sensor.

16. The method of claim 11, further comprising, in a third mode in which a first subset of keys of the keyboard satisfies the detection condition and a second subset of keys of the keyboard does not satisfy the detection condition, detecting, via the touch sensor, keystroke input applied to the first subset of the keys of the keyboard, and receiving, via the wireless receiver, keystroke input applied to the second subset of the keys of the keyboard.

17. A touch-sensitive display device, comprising:
  a display;
  a touch sensor to detect a touch input at the display;
  a wireless receiver;
  a logic subsystem; and
  a storage subsystem comprising instructions executable by the logic subsystem to:
    in a first mode in which a keyboard overlaid upon the display satisfies a detection condition of the touch sensor and a wireless transmitter of the keyboard is disabled, detect a first keystroke input applied to one or more keys of the keyboard via the touch sensor; and
    in a second mode in which the keyboard does not satisfy the detection condition of the touch sensor and the wireless transmitter of the keyboard is enabled, receive a second keystroke input applied to one or more keys of the keyboard and transmitted by the wireless transmitter of the keyboard to the wireless receiver, the second keystroke input being detected at least in part by the keyboard operating in the second mode.

18. The touch-sensitive display device of claim 17, wherein the first keystroke input and the second keystroke input applied to the keyboard is a typing input.

* * * * *